United States Patent [19]

Iiyama et al.

[11] Patent Number: 5,535,103
[45] Date of Patent: Jul. 9, 1996

[54] VEHICULAR HEADLAMP HAVING IMPROVED COVER MEMBER

[75] Inventors: Katsuhiko Iiyama; Takaaki Nishizawa, both of Shizuoka, Japan

[73] Assignee: Koito Manufacturing Co., Ltd., Tokyo, Japan

[21] Appl. No.: 425,805

[22] Filed: Apr. 20, 1995

[30] Foreign Application Priority Data

Apr. 26, 1994 [JP] Japan .................................. 6-109137

[51] Int. Cl.⁶ .................................................. B60Q 1/068
[52] U.S. Cl. ............................ 362/66; 362/69; 362/273; 362/423; 362/424
[58] Field of Search .................................. 362/66, 61, 69, 362/273, 422, 423, 424

[56] References Cited

U.S. PATENT DOCUMENTS

| | | | |
|---|---|---|---|
| 4,689,725 | 8/1987 | Saijo et al. | 362/66 |
| 4,703,399 | 10/1987 | Van Duyn et al. | 362/61 |
| 4,843,523 | 6/1989 | Nakamura | 362/69 |
| 4,845,598 | 7/1989 | Watanabe et al. | 362/61 |
| 4,881,152 | 11/1989 | Watanabe et al. | 362/61 |
| 4,930,367 | 6/1990 | Nagasawa | 74/423 |
| 5,165,775 | 11/1992 | Lisak et al. | 362/66 |

*Primary Examiner*—Denise L. Gromada
*Assistant Examiner*—Alfred Basichas
*Attorney, Agent, or Firm*—Sughrue, Mion, Zinn, Macpeak & Seas

[57] ABSTRACT

A vehicular headlamp which includes a lamp housing and a reflector tiltably supported within the lamp housing by an aiming screw and aiming fulcrums. The aiming screw penetrates the lamp housing and is rotatably supported thereby. The front end of the aiming screw engages the reflector while the rear end protrudes from the lamp housing and is secured to a gear. An adjustment shaft is rotatably supported by the lamp housing, a rear end of the adjustment shaft being fixed to a gear engaging with the gear of the aiming screw. The two gears constitute a gear section which is covered with a cover member having an opening which opens downward, thereby preventing foreign matter such as dirt, water or dust from adhering to the gear section and allowing foreign matter to be immediately discharged from the cover member.

9 Claims, 7 Drawing Sheets

VEHICULAR HEADLAMP HAVING IMPROVED COVER MEMBER

BACKGROUND OF THE INVENTION

The present invention relates generally to a vehicular headlamp. More particularly, the invention relates to a vehicular headlamp having a reflector which is tiltably supported within a lamp housing by an aiming screw and aiming fulcrums, in which a main part is covered with a cover member to thereby prevent foreign matter such as dirt, water or dust from adhering to the main part and to allow foreign matter to be immediately discharged from the cover member.

There has been known a conventional vehicular headlamp having a reflector which is tiltably mounted inside a lamp housing, in which the illumination angle of the headlamp is adjusted by tilting the reflector.

FIG. 7 is a partial sectional view showing an example of a conventional vehicular headlamp of this type in which a reflector b is tiltably supported within a lamp housing e by an aiming screw c and an aiming fulcrum d. The aiming screw c penetrates the lamp housing e and is rotatably supported thereby. The front end of the aiming screw c engages a nut f supported by the reflector b, and the rear end of the aiming screw c, which protrudes from the lamp housing e, is secured to a gear g.

The conventional headlamp also includes an adjustment shaft h rotatably supported by the lamp housing e. A gear i fixed to the rear end of the adjustment shaft h engages the gear g secured to the aiming screw c.

When the adjustment shaft h is rotated, the aiming screw c is rotated through the gear i of the shaft h and the gear g of the screw c, and hence the front end of the aiming screw c is screwed in or out the nut f in accordance with the rotational direction of the screw, so that the reflector b pivotally rotates with respect to the aiming fulcrum d acting as a pivot fulcrum.

However, the conventional headlamp is disadvantageous in that foreign matter such as dirt, water or dust can easily adhere to the engagement portion of the gears g and i because the engagement portion is exposed to the outside. This can impede smooth rotation of the gears g and i.

FIG. 8 is a partial sectional view showing another example of a conventional vehicular headlamp in which the gears g and i are covered with a cover j to partially solve the problem discussed above. Indeed, the provision of the cover j which covers the gears g and i prevents dirt or the like from adhering to the gears g and i. However, if nonetheless some dirt or water enters the cover j, it remains within the cover j where it can impede smooth rotation of the gears g and i. Sometimes in such cases water can even cause the gears to rust.

SUMMARY OF THE INVENTION

The present invention was made in view of the foregoing problems accompanying the conventional vehicular lamp.

Accordingly, it is an object of the present invention to provide a vehicular lamp which is capable of preventing foreign matter such as dirt, water or dust from adhering to the main part.

Another object of the present invention to provide a vehicular lamp which allows any foreign matter which does enter the cover member to be immediately discharged from a cover member, so that the foreign matter does not remain in the cover member.

The above and other objects are achieved by the provision of a vehicular headlamp which, according to the present invention, includes a lamp housing, a reflector tiltably supported within the lamp housing by an aiming screw and aiming fulcrums, the aiming screw penetrating the lamp housing and being rotatably supported thereby, a front end of the aiming screw engaging with the reflector and a rear end thereof which protrudes out of the lamp housing being secured to a gear, and an adjustment shaft rotatably supported by the lamp housing, a rear end of the adjustment shaft being fixed to a gear engaging with the gear of the aiming screw. The two gears together constitute a gear section which is covered with a cover member having an opening which opens downward.

According to the present invention, since the gear section is covered with the cover member, foreign matter such as dirt or water is for the most part prevented from adhering to the gear section. Further, even if some dirt or water enters the cover member, it is easily discharged from the cover member through the opening formed therein since the cover member opens downward.

Accordingly, the cover member of the present invention avoids the problems of the dirt or water entering the cover member and impeding smooth rotation of the gears or causing rusting of the gears due to dirt or water remaining in the cover member.

DESCRIPTION OF THE PREFERRED EMBODIMENTS

A preferred embodiment of a vehicular headlamp constructed according to the present invention will now be described with reference to the accompanying drawings.

The headlamp 1 is provided with a cup-shaped lamp housing 2 formed of synthetic resin having an opening which is inclined rearward while being directed rightward.

Figure 1:
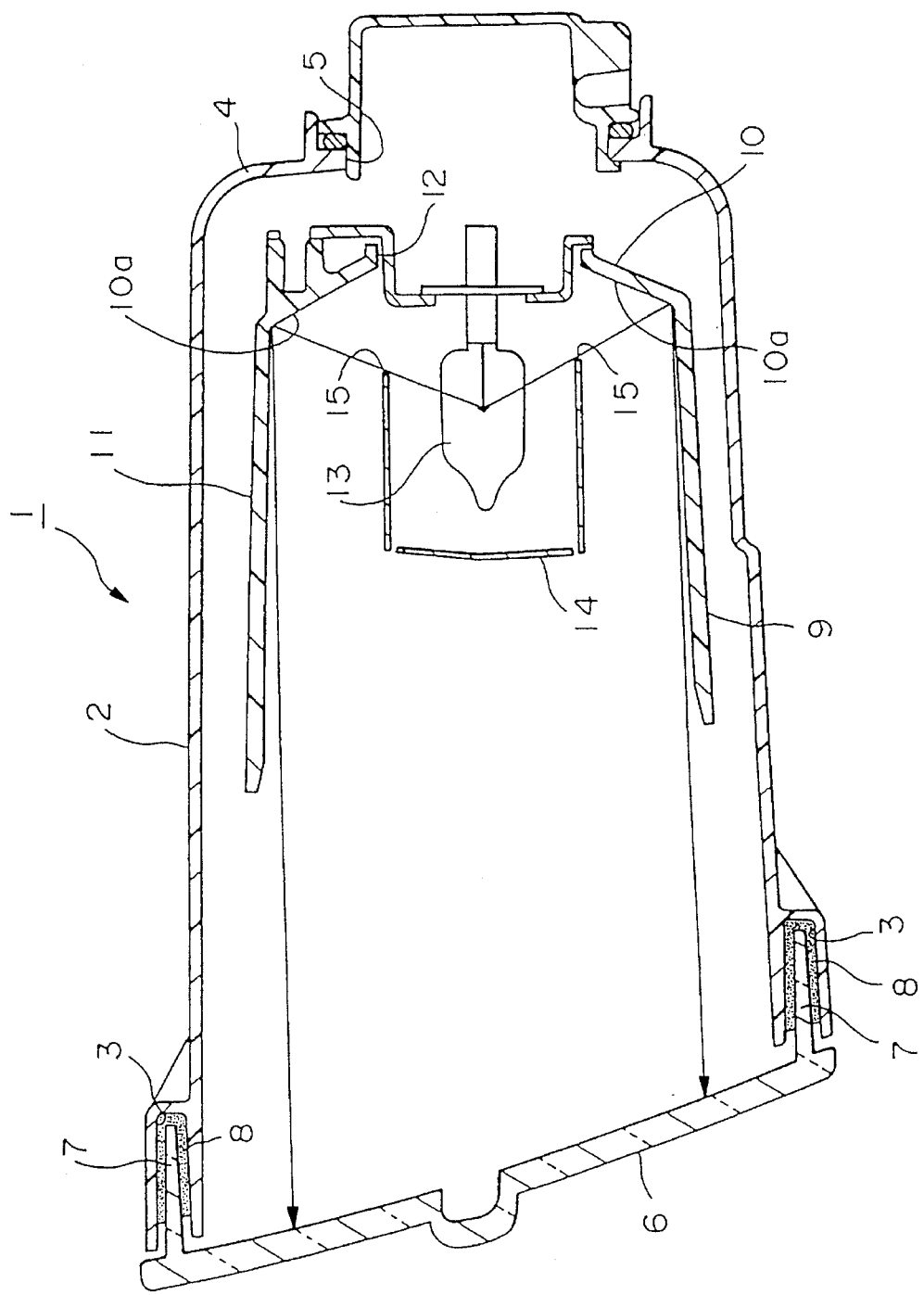
FIG. 1 is a cross-sectional view showing a preferred embodiment of a vehicular headlamp constructed according to the invention.
Figure 2:
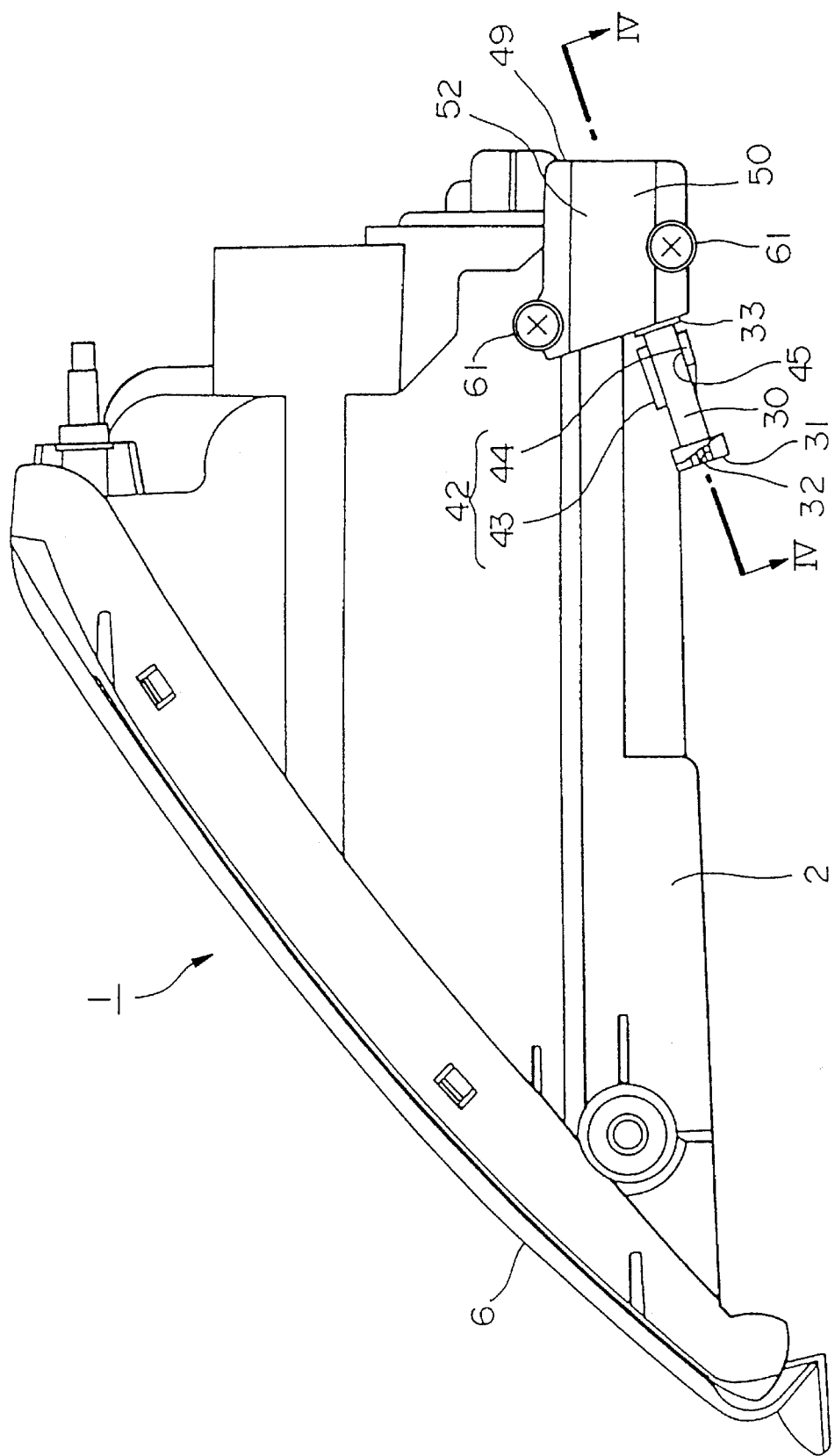
FIG. 2 is a plan view of the vehicular headlamp shown in FIG. 1.
Figure 3:
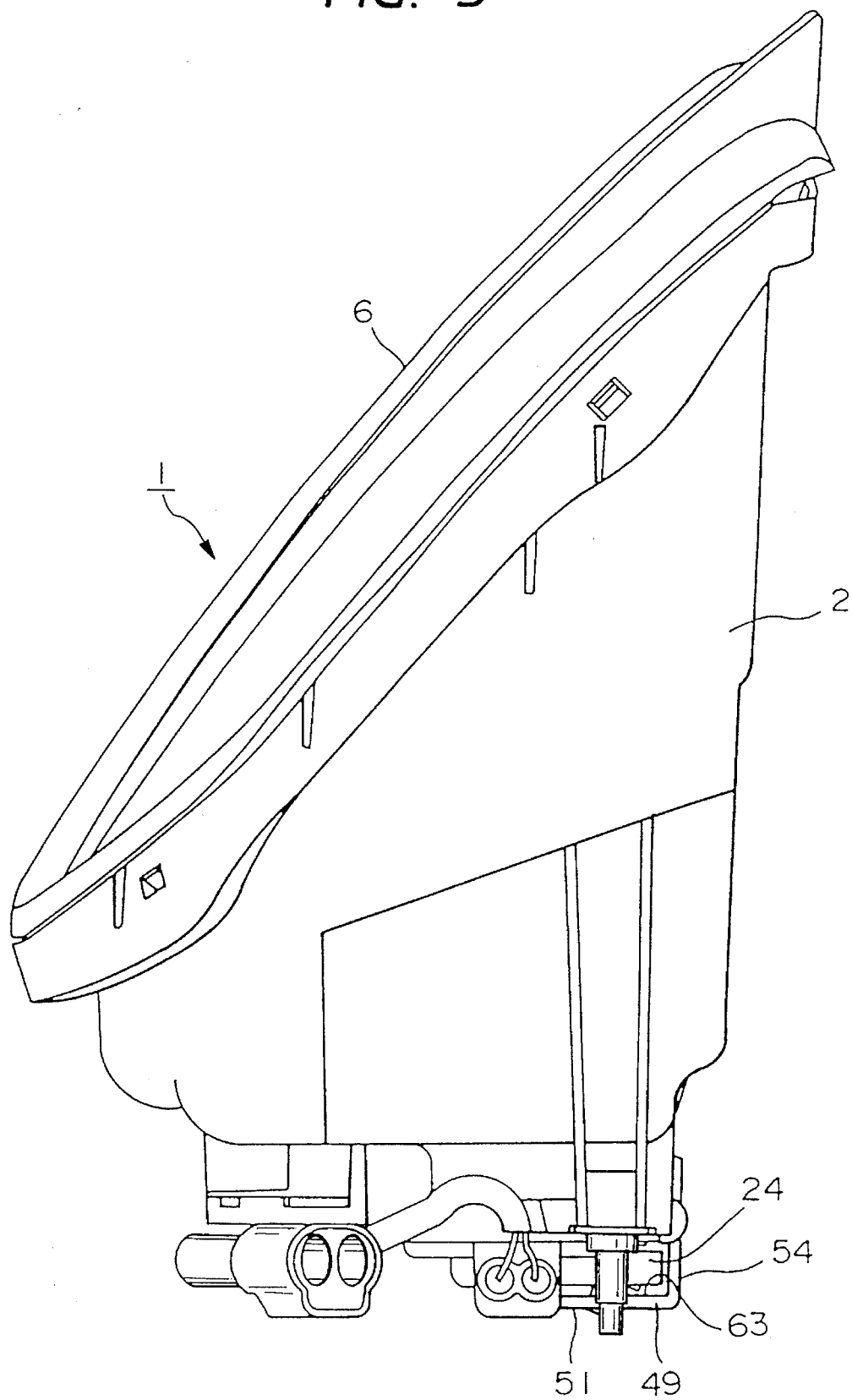
FIG. 3 is a rear view of the vehicular headlamp shown in FIG. 1.

With respect to the directions referred to hereinbelow, the directions of left, right, up, down, front face and rear face of the sheet of FIG. 2 correspond to front, rear, right, left, up and down directions of the headlamp, respectively.

The lamp housing 2 is provided at the periphery of the front opening thereof with a mounting groove 3 opening frontward, and a through-hole 5 for receiving a light bulb at approximately the center position of a rear wall 4 thereof. The headlamp 1 also includes a front lens 6 having a mounting leg 7 projecting rearward from the peripheral part thereof. The mounting leg 7 of the front lens 6 is inserted in the mounting groove 3 of the lamp housing 2. A hot melt or the like is filled in the groove to secure and seal the front lens 6 to the lamp housing 2. The mounting leg 7 may also be affixed, if appropriate, by means of a screw or by caulking to enhance the connection.

The headlamp 1 houses therein a reflector 9 formed of synthetic resin which has a parabolic surface part 10 at a rear thereof and a side wall part 11 extending frontward from the periphery of the parabolic surface part 10. The parabolic surface part 10 and the side wall part 11 are integrally formed with each other to constitute the reflector. The front face 10a of the parabolic surface part 10, which is parabolic in shape, is coated with an aluminum deposition or the like to form a reflecting surface.

A bulb mounting hole 12 is formed in the parabolic surface part 10 of the reflector 9, and a clear light bulb 13 is detachably engaged in the bulb mounting hole.

A substantially cylindrical shield cap 14 having a closed front end is supported by the reflector 9 with the shield cap 14 surrounding the side and front of the light bulb 13. The shield cap 14 is provided with a notch 15 through which light emitted from the light bulb 13 irradiates only to the reflecting surface 10a. In other words, the shield cap 14 shields light emitted from the light bulb 13 except for light directed to the front and reflecting surface 10a of the reflector 9.

The reflector 9 thus constructed is supported by the lamp housing 2 in such a manner that it is tiltable within a chamber defined by the lamp housing 2 and the front lens 6. The support of the reflector 9 is accomplished by a pair of aiming fulcrums and one aiming screw.

Specifically, aiming fulcrum 16 supports lower left parts of the reflector 9 through a cylindrical boot 17 formed of an elastic material such as a rubber. The boot 17 has a closed end.

A cylindrical support shaft 18 projects frontward from a rear wall 4 of the lamp housing 2 and engages with the boot 17. While engaging the support shaft 18 with the boot 17, a screw 18a penetrates a closed end of the boot 17 from the inside of the reflector 9 and threadably engages the support shaft 18. Although not shown in the figures, another aiming fulcrum is also provided at a position spaced apart rightward from the aiming fulcrum 16, which is constituted by a cylindrical boot formed of a resilient material and secured to the reflector and a support shaft protruding from the rear wall 4 of the lamp housing 2, similar to the aiming fulcrum 16. The reflector 9 is thus supported at the lower part thereof by this pair of aiming fulcrums, and thus is connected to the lamp housing 2 in such a manner that the reflector 9 is vertically tiltable.

A support piece 19 projects from the rear surface of the parabolic surface part 10 of the reflector 9 at an upper left part thereof. A nut 20, formed of synthetic resin, is supported by the support piece 19. An aiming screw 21, formed of metal, is provided at approximately the front half thereof with a threaded part 22, and at a rear part of the threaded part 22 with a large diameter part. An annularly extending thin engaging groove 23 is formed on the outer peripheral surface of the aiming screw 21 slightly to the rear of the threaded part 22.

A gear 24 is secured to the rear end part of the aiming screw 21, and a flange 25 is disposed at the near front of the gear 24. On the other hand, a through-hole 26 formed in the rear wall 4 of the lamp housing 2 is provided with an annularly extending concave cut-out 27 at the periphery of the rear side opening thereof.

During assembly, the aiming screw 21 is inserted into the through-hole 26 formed in the lamp housing 2 from the rear. A spring washer 28 engages the engaging groove 23 of the aiming screw 21 and comes into abutment resiliently against the inner face of the rear wall 4 of the lamp housing 2 so that the aiming screw 21 is rotatably supported by the lamp housing 2. An O-ring 29 is fitted into the concave cut-out 27 formed on the periphery of the rear side opening of the through-hole 26. The O-ring is compressed between the flange 25 of the aiming screw 21 and the rear wall 4 of the lamp housing 2, thereby to seal the through-hole 26. The threaded part 22 of the aiming screw 21 is threadably engaged with the nut 20 which is supported by the reflector 9.

Figure 4:
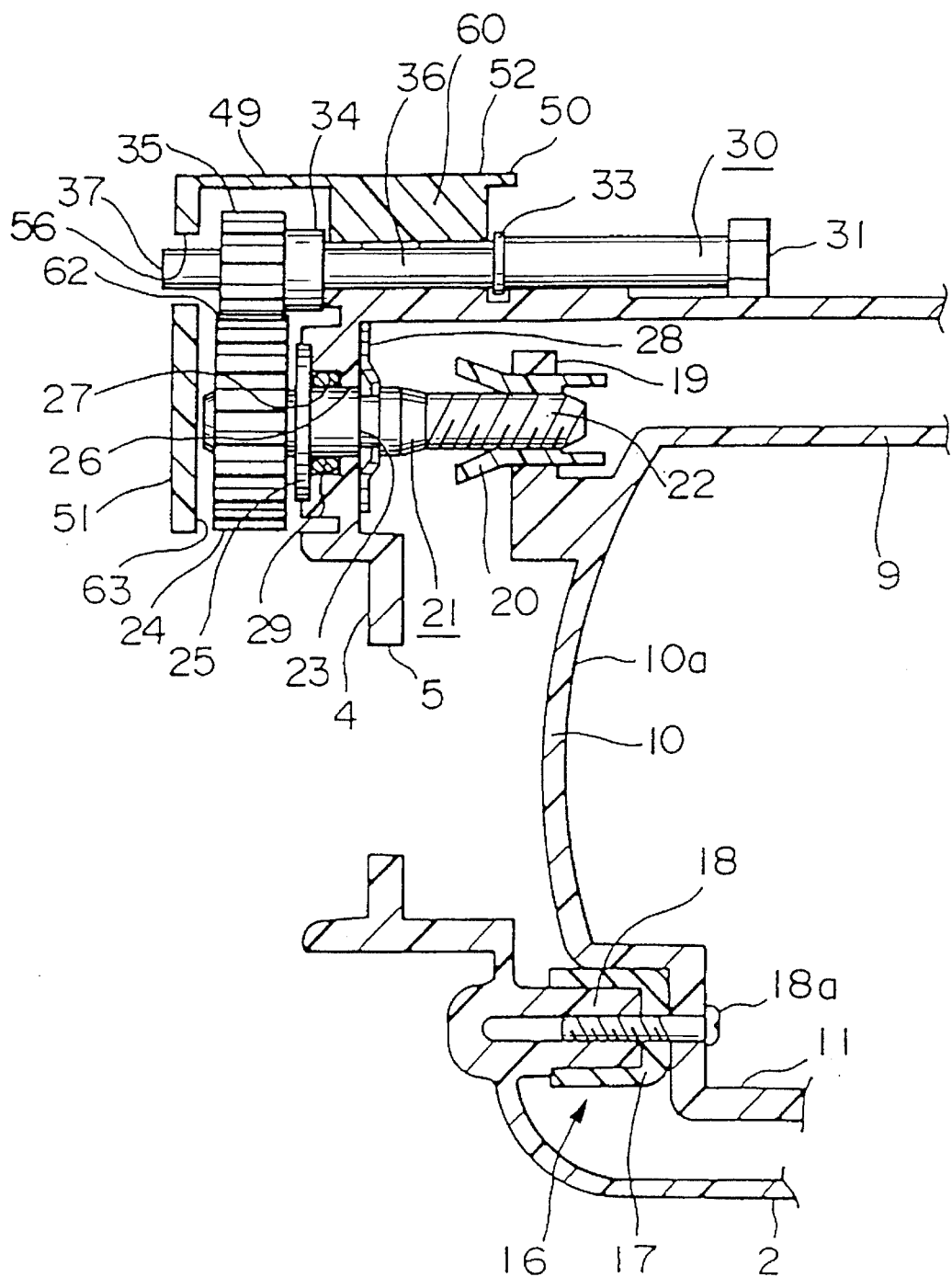
FIG. 4 is a partially enlarged view cut along lines IV—IV in FIG. 2.

An adjustment shaft 30 formed of metal is provided at a front end thereof with a head part 31. The head part 31 has a hexagonal contour when viewed from the front, and an engaging groove 32 is formed at a center part of a front surface thereof. A flange 33 is formed on the adjustment shaft 30 at approximately the center part in a longitudinal direction thereof. As shown in FIG. 4, the diameter of the rear half of the adjustment shaft 30 is less than that of the front half thereof, with the flange 33 as a border. Another flange 34 is formed on the adjustment shaft 30 at a position to the rear from the flange 33, and a gear 35 is securely mounted on the adjustment shaft, contacting the rear surface of the flange 34 with a front surface of the gear 35. A part of the adjustment shaft 30 between the flanges 33 and 34 acts as a middle supported part 36, and a part protruding rearward from the gear 35 constitutes a rear supported part 37.

A support part 38 is disposed on an upper part of the lamp housing 2 at a left-rear part thereof. The support part 38 is constituted by a pair of walls 39 and 40, which project upward and extend in parallel, and a support groove 41 defined by the walls. The walls 39 and 40 are formed in such a manner that the front ends thereof are directed leftward to some extent, and the length thereof is substantially equal to that of the middle supported part 36 of the adjustment shaft 30.

A supplemental support part 42 disposed at the front side of the support part 38 is constituted by a pair of walls 43 and 44 projecting upward and extending in parallel and a support groove 45 defined by the walls. The width and depth of the support groove 45 of the supplemental support part 42 are slightly larger than those of the support groove 41 of the support part 38.

A support boss 46 is integrally formed with a wall 40 of the support part 38 at an outer face thereof. A threaded hole 47 is formed in an upper face of the support boss 46. Also, a threaded hole 48 is formed in an upper face of the lamp housing 2 at a position rearward of the support part 38.

Figure 6:
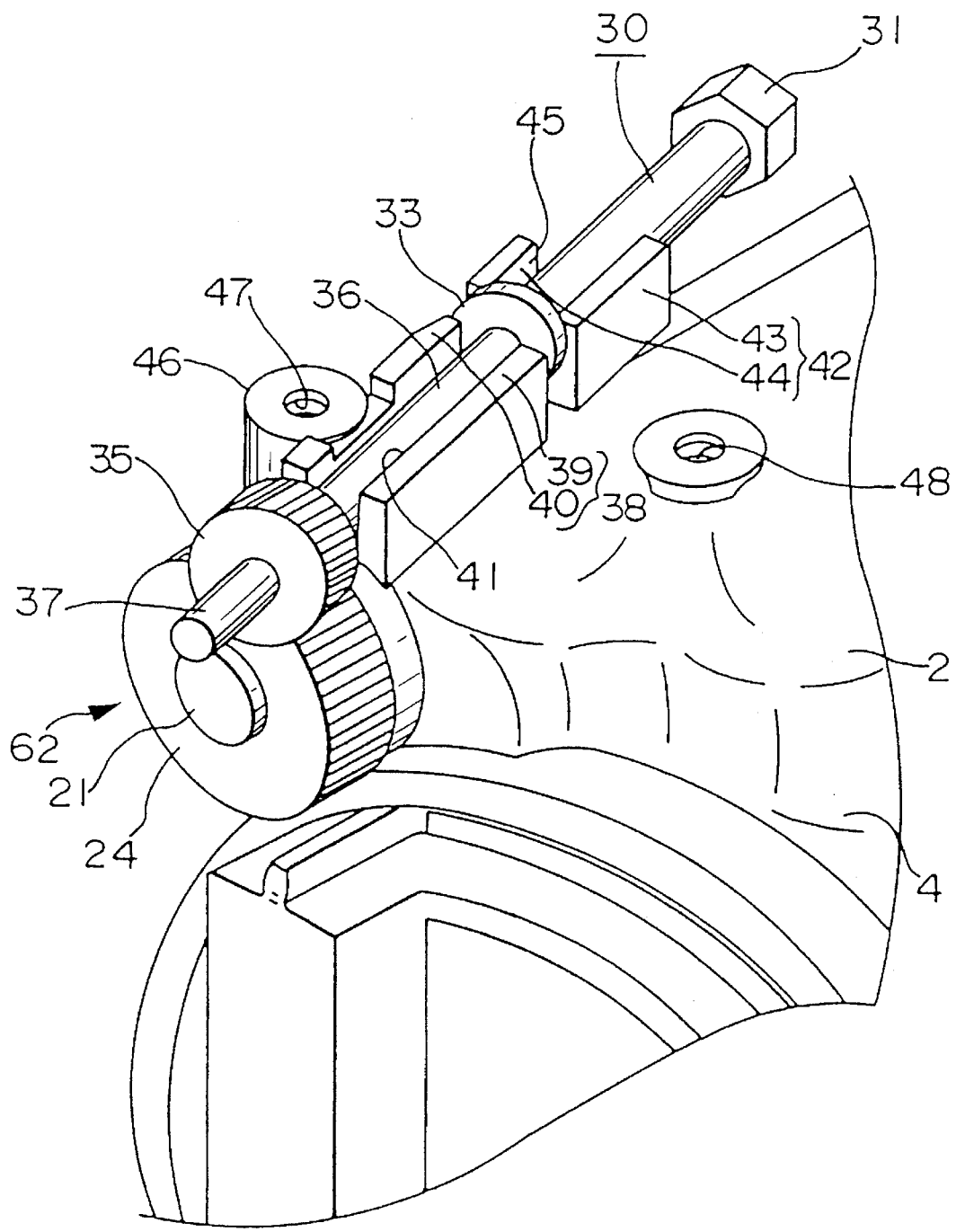
FIG. 6 is an enlarged view of important parts of the invention with the cover member removed.
Figure 7:
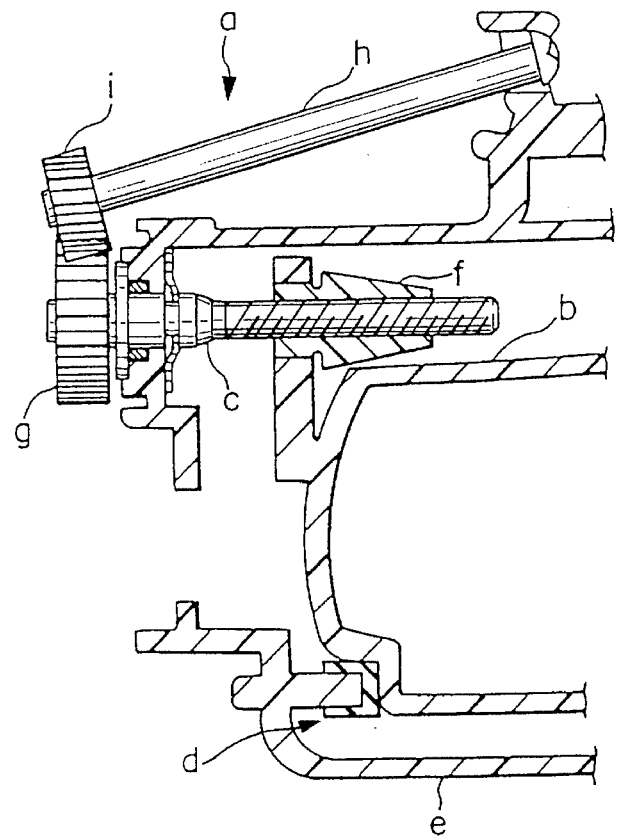
FIG. 7 is a partial sectional view showing an example of a conventional vehicular headlamp.
Figure 8:
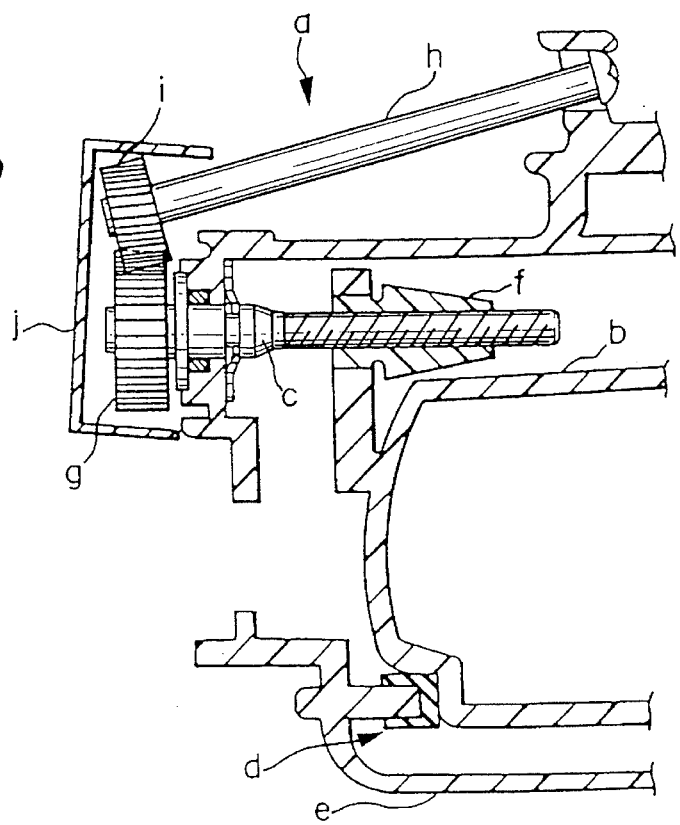
FIG. 8 is a partial sectional view showing another example of a conventional vehicular headlamp.

When, as best shown in FIG. 6, the middle supported part 36 of the adjustment shaft 30 is mounted rotatably in the support groove 41 of the support part 38 of the lamp housing 2, the front flange 33 of the adjustment shaft 30 contacts or nearly contacts the front end faces of the walls 39 and 40 of the support part 38, whereas the rear flange 34 contacts or nearly contacts the rear end faces of the walls 39 and 40, thereby to define the front-rear position of the adjustment shaft 30. In this state, the gear 35 of the adjustment shaft 30 engages with the gear 24 of the aiming screw 21 to constitute a gear engagement section 62. On the other hand, the adjustment shaft 30 is also mounted rotatably in the support groove 45 of the supplemental support part 42 at a rear portion of the front half from the flange 33.

Figure 5:
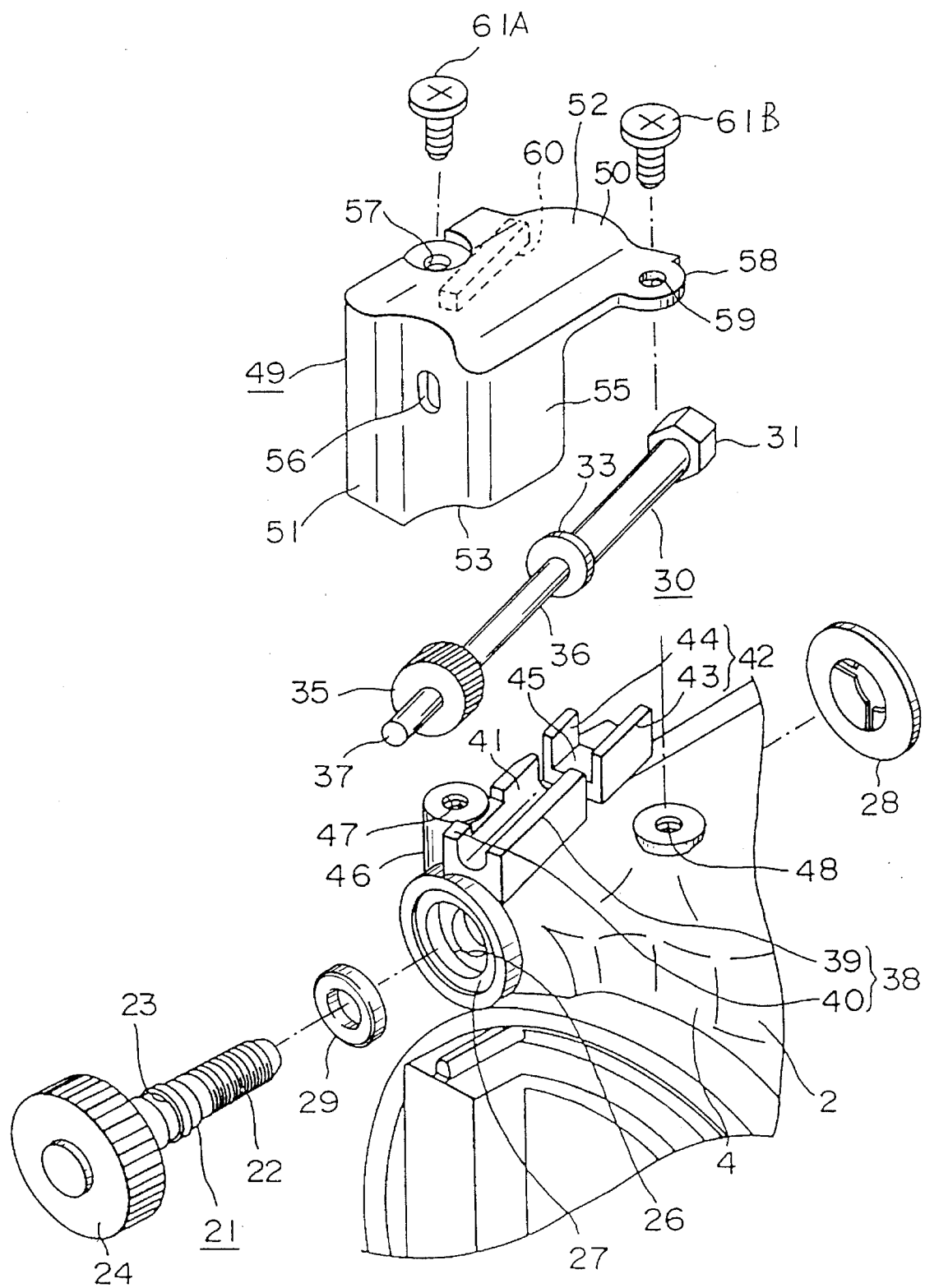
FIG. 5 is an exploded perspective view showing important parts of the invention.

A cover member 49 formed of synthetic resin is provided with an upper wall 50 and a rear wall 51 disposed substantially perpendicular to the upper wall 50. The cover member 49 does not have a bottom wall but an opening 63 which opens downward. A center part 52 in the lateral direction of the upper wall 50 is curved upward in an arcuate manner. As best shown in FIG. 5, a lower right part 53 of the rear wall 51 is cut out in a smooth arcuate shape where the rightward side is higher. The shape of the inclined lower right part 53 corresponds to the through-hole 5 formed in the rear wall 4 of the lamp housing 2. The cover member 49 is also provided with a pair of side walls 54 and 55 extending frontward from both left and right edges of the rear wall 51. A support hole 56 is formed in the rear wall 51 at an upper right portion thereof. The support hole 56 is slightly elongated in the vertical direction.

A through-hole 57 is formed in the upper wall 50 at approximately the left center thereof, whereas a through-hole 59 is formed in a mounting piece 58 projecting rightward from the front right edge of the upper wall 50. A pushing projection 60 protrudes from the under surface of the upper wall 50 and extends in an inclined manner so that the front end is directed slightly leftward. The pushing projection 60 has a width which is narrower than the width of the support groove 41 formed on the upper face of the lamp housing 2.

The cover member 49 thus provided is mounted to the lamp housing 2 so that the rear and side of the gears 24 and 35 are surrounded by the rear wall 51 and the side walls 54 and 55, whereas the top of the gear 35 and the rear half of the adjustment shaft 30 are surrounded by the upper wall 50. Mounting screws 61A and 61B are threadably engaged with the threaded holes 47 and 48 formed in the lamp housing 2 through the through-holes 57 and 59 of the cover member 49, respectively, so that the cover member 49 is secured to the lamp housing 2.

The rear supported part 37 of the adjustment shaft 30 is engaged with the support hole 56 formed in the rear wall 51 of the cover member 49. The pushing projection 60 formed on the undersurface of the upper wall 50 fits in the support groove 41 of the support part 38 and contacts or nearly contacts the middle supported part 36 of the adjustment shaft 30, which was previously mounted in the support groove 41, so that the adjustment shaft 30 is prevented from moving upward.

When the adjustment shaft 30 is rotated by operating the head with a tool such as a hexagonal socket wrench or a Phillips screwdriver, the rotational force is transmitted to the aiming screw 21 through the gears 35 and 24, so that the threaded part 22 of the aiming screw 21 is screwed into or out of the nut 20 supported by the reflector 9. As a result, the reflector 9 is tilted with respect to the lamp housing 2 while the boots 17 are resiliently deformed near the aiming fulcrum 16 because the reflector 9 moves in the front-rear direction with the nut 20.

As described above, according to the present invention, since the gear engagement section 62 constituted by the gears 24 and 35 is substantially covered by the cover member 49 mounted on the lamp housing 2, foreign matter such as dirt or water is for the most part prevented from adhering to the gear engagement section 62. Further, since the cover member 49 has the lower opening 63, any foreign matter which might enter the cover member 49 can be immediately discharged from the cover member through the opening 63, so that no foreign matter remains in the cover member. Therefore, smooth rotation of the gears is not impeded and the gears do not become rusty.

As described above, a vehicular headlamp according to the present invention includes a lamp housing, a reflector tiltably supported within the lamp housing by an aiming screw and aiming fulcrums, the aiming screw penetrating the lamp housing and being rotatably supported thereby, the front end of the aiming screw engaging with the reflector and the rear end protruding out of the lamp housing being secured to a gear, and an adjustment shaft rotatably supported by the lamp housing, the rear end of the adjustment shaft being fixed to a gear engaging with the gear of the aiming screw. The two gears together constitute a gear section which is covered with a cover member having an opening which opens downward.

According to the present invention, since the gear section is covered with the cover member, foreign matter such as dirt or water is for the most part prevented from adhering to the gear section. Further, even if some dirt or water enters the cover member, it is readily discharged from the cover member through the opening formed on the cover member because the opening opens downward.

Accordingly, the cover member of the present invention avoids the problems encountered when dirt or water enters the cover member and impedes smooth rotation of the gears or the gears rust due to dirt or water retained in the cover member.

It should be understood that the form of the invention herein shown and described is to be taken as a preferred example of the invention and that various changes in the shape, size and arrangement of parts may be resorted to without departing from the spirit of the invention or the scope of the subjoined claims.

What is claimed is:

1. A vehicular headlamp, comprising:

a lamp housing;

a reflector disposed within said lamp housing;

an aiming device comprising:

an aiming fulcrum tiltably supporting said reflector within said lamp housing;

an aiming screw, said aiming screw penetrating said lamp housing and being rotatably supported thereby, said aiming screw comprising a front end engaging with said reflector and a rear end protruding from said lamp housing;

a first gear secured to said rear end of said aiming screw;

an adjustment shaft rotatably supported by said lamp housing; and a second gear secured to a rear end of said adjustment shaft, said second gear engaging with said first gear of said aiming device; and a cover member covering both said first and second gears, said cover member being substantially bottomless so that any foreign matter that enters a gear section, including said first and second gears, will drop downwardly so as to exit said gear section.

2. The vehicular headlamp according to claim 1, wherein said cover member is formed of synthetic resin.

3. The vehicular headlamp according to claim 1, further comprising at least one screw securing said cover member to said lamp housing.

4. The vehicular headlamp according to claim 1, wherein said lamp housing includes a support portion defining an upwardly open groove in which the adjustment shaft is rotatably supported and to further recite that the cover member covers said groove to thereby retain said adjustment shaft therein.

5. The vehicular headlamp according to claim 1, wherein said cover member includes a hole for receiving a distal end of said adjustment shaft so as to thereby rotatably support said adjustment shaft.

6. The vehicular headlamp according to claim 1, wherein said cover member is removable from said lamp housing.

7. A vehicular headlamp, comprising:

a lamp housing;

a reflector disposed within said lamp housing;

an aiming device comprising:

an aiming fulcrum tiltably supporting said reflector within said lamp housing;

an aiming screw, said aiming screw penetrating said lamp housing and being rotatably supported thereby, said aiming screw comprising a front end engaging with said reflector and a rear end protruding from said lamp housing;

a first gear secured to said rear end of said aiming screw;

an adjustment shaft rotatably supported by said lamp housing; and a second gear secured to a rear end of said adjustment shaft, said second gear engaging with said first gear of said aiming device; and a cover member covering both said first and second gears, said cover member having an opening which opens downward; wherein said cover member comprises:

an upper wall, a center part in lateral direction of said upper wall being arcuately curved upward;

a rear wall disposed substantially perpendicular to said upper wall, a lower right part of said rear wall being cut out in a smooth arcuate shape, where rightward is higher;

a pair of side walls extending frontward from both left and right edges of said rear wall;

a support hole formed in said rear wall at an upper right portion thereof, said support hole being slightly elongated in a vertical direction;

a first through-hole formed in said upper wall at approximately a left center portion thereof;

a mounting piece projecting rightward from a front right edge of said upper wall;

a second through-hole formed in said mounting piece; and a pushing projection protruding from an undersurface of said wall and extending in an inclined manner so that a front end of said pushing projection extends slightly leftward.

8. The vehicular headlamp according to claim 7, wherein a support groove is formed on an upper face of said lamp housing, said pushing projection having a width less than a width of a support groove formed on an upper face of said lamp housing.

9. The vehicular headlamp according to claim 7, wherein said cover member is formed of synthetic resin.

* * * * *